April 16, 1968 R. D. COPLEY ET AL 3,378,309
COTTON HARVESTER
Filed Aug. 29, 1966

INVENTOR.
R. D. COPLEY &
G. R. SUTHERLAND
BY
William A. Murray
ATTORNEY

United States Patent Office 3,378,309
Patented Apr. 16, 1968

3,378,309
COTTON HARVESTER
Russell Dean Copley, Ankeny, and Gail Russell Sutherland, Des Moines, Iowa, assignors to Deere & Company, Moline, Ill., a corporation of Delaware
Filed Aug. 29, 1966, Ser. No. 575,650
3 Claims. (Cl. 302—17)

This invention relates to a cotton harvester and more particularly to the conveying means between the harvesting unit and the cotton receptacle or basket that collects and accumulates the cotton. In conventional type cotton harvesters there is normally provided a cotton picking or harvesting unit that detaches the ripe cotton bolls from the plants and dispatches them within a housing structure. Supported on the housing structure in an outboard relation thereto is a casing that has an opening into the housing structure so that the cotton may be received in the casing. The casing has a material discharge outlet. Normally there is provided a blower having a suction inlet connected to the outlet and a blower discharge duct extending from the blower to a cotton receptacle. Consequently the cotton moves from the casing through the suction duct into the blower and from thence outwardly and upwardly into the receptacle.

The problem with such an arrangement is that as the cotton moves through the blower, it often comes in contact with the fan blades and the cotton seeds are tracked or otherwise soil the ripened cotton bolls. Also, any foreign matter that moves through the blades with the cotton tends to adhere strongly to the cotton. Consequently, while this method of moving cotton is acceptable for the purpose of conveying, it creates a problem relative to the quality of cotton since it soils the cotton.

With the above in mind, it is proposed to provide a blower that is in a remote position relative to a single continuous conduit that extends from the outlet of the casing on the cotton harvester to the cotton container or basket. The conduit has an elbow therein that receives the blower discharge duct so that the cotton moves through the elbow and into the stream of air passing through the blower duct and into the upper end of the conduit. Since the air will move into the upper portion of the conduit under high pressure, this will cause a vacuum or suction in the lower end of the conduit and also into the casing that receives the cotton from the cotton harvester. Consequently, cotton is first drawn through the casing and through the lower portion of the conduit and is then blown upwardly through the upper portion of the conduit. However, the cotton never passes through the blower and consequently is not soiled or damaged due to contact with the blower blades or rotor.

Other objects of the invention will become apparent to those skilled in the art as the nature of the invention is better understood from the following description and as shown in the accompanying drawings.

Figure 1:
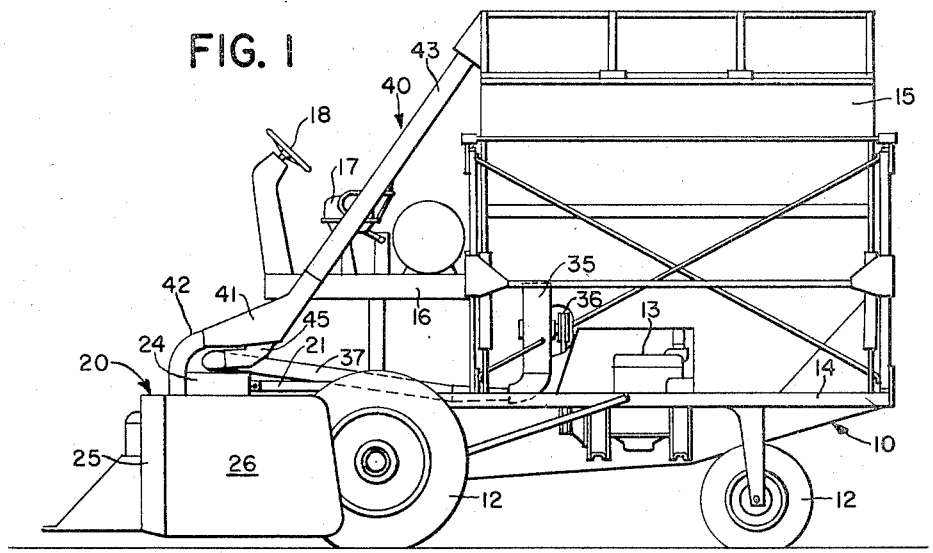
FIG. 1 is a side view of a cotton harvester.
Figure 2:
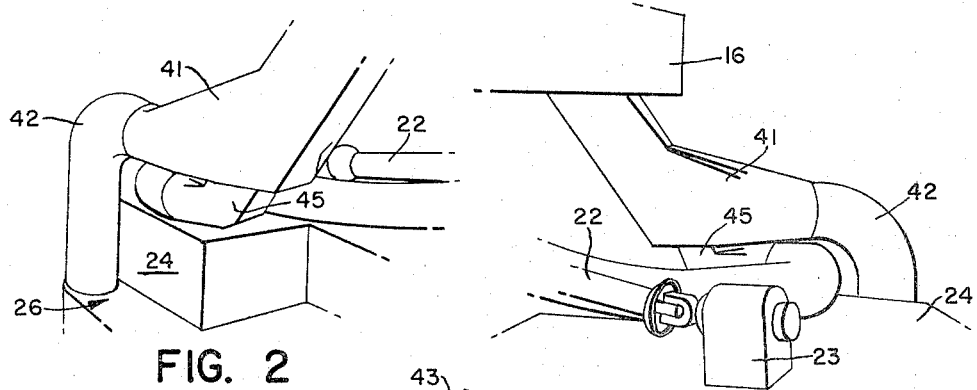
FIG. 2 is a side and rear perspective view of an upper portion of the cotton harvester.
Figure 3:
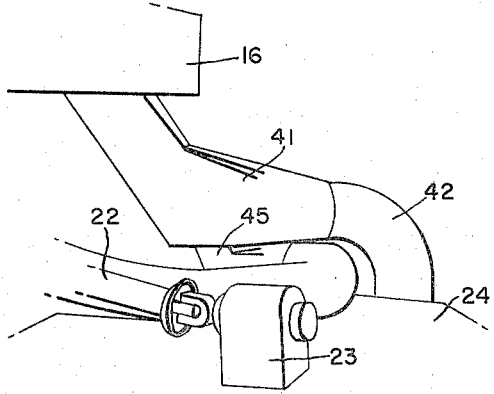
FIG. 3 is a side perspective view taken from the opposite side of the portion of the harvester shown in FIG. 2.

The cotton harvester as shown in FIG. 1 may be basically of the type shown in U.S. Patent 3,088,262 which issued to K. I. Graham on May 7, 1963, with the exception of the means for moving the harvested cotton between the basic harvesting units and the basket or container. The cotton harvester is composed of a main mobile vehicle 10 having rear steerable wheels 11 and front traction wheels 12. The vehicle has a main power unit or engine 13 and a main frame 14 that supports a cotton container or basket 15 and a front or forward positioned operator's platform 16 having a seat 17, steering mechanism 18 and other suitable controls, not shown, by which the entire harvester is operated. Supported on the forward end of the vehicle 10 is a pair of harvesting units 20. The harvesting units 20 are constructed and arranged in the manner shown and described in the aforementioned Graham patent with the exception of the discharge means which will presently be described. The units 20 are supported on lift arms 21 that are adapted by suitable hydraulic means, not shown, to raise and lower the units. Each unit 20 is driven by a main drive shaft 22 that is connected to the main power unit 13 by suitable drive mechanism, not shown. The drive shafts 22 extend into a bevel gear arrangement, indicated by its housing 23, and from thence downwardly into a main gear and chain drive housing 24 that is fixed on top of the main housing structure 25. Normally the housing structure is divided into a pair of upright compartments that are disposed on opposite sides of a row of plants. Harvesting mechanism is contained in the housing that reaches into the respective rows of plants and harvests the cotton from those plants. The housing structure 25 also includes outboard casings 26 that have inner and outer upright walls 27, 28 respectively with the inner wall 27 having an upright opening 29 that opens inwardly into the housing structure 25 to receive cotton bolls that have been harvested from the mechanism contained therein. The casings 26 are divided into two compartments by an upright panel 30 that has its lower edge spaced above the floor panel 31 of the casing 26 so as to define with the respective walls 27, 28 a passage through which cotton may pass from the rear to the forward compartment. The forward compartment has an upper boll discharge outlet defined by a circular lip 32.

Means for moving the harvested cotton from the door or casing structure 26 includes in part a blower 35 positioned remotely from the harvesting units 20 and at a point adjacent the engine 13. A suitable belt drive 36 extends from the engine transmission to the blower and operates to rotate the blower fan or rotor. The discharge for the blower 35 is an elongated forwardly extending blower duct 37. Conduit means that includes a single uninterrupted conduit 40 extends from the outlet 32 upwardly and rearwardly to the upper forward end of the basket 15. The conduit 40 includes a centrally located elbow section 41 that is joined with a forward and downwardly curved conduit section 42 having its lower end fitted over the lip or outlet 32. The conduit 40 also has a rearwardly and upwardly extending section 43 that extends from the elbow 41 to the upper discharge end at the forward upper side of the basket 15. The elbow 41 is utilized to turn or redirect the cotton from the forward section 42 in an upper and rearwardly direction.

Figure 4:
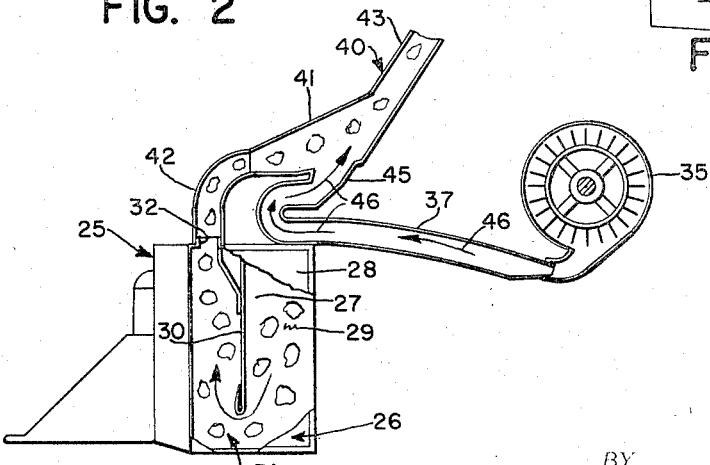
FIG. 4 is a representative illustration of the structure of the present invention.

The blower duct 37 has a juncture 45 with the lower underside of the elbow 41 that operates to direct air from the juncture upwardly and rearwardly along the axis of the extension or section 43. The direction of air flow is best shown by the arrows 46 in FIG. 4.

In operation, the movement of air through the upper section 43 will cause a suction or induced flow of air through the forward portion of the elbow 41, the forward conduit section 42, the forward compartment of the casing 26 and the passage between the lower edge of the panel 30 and the floor 31. Consequently, the ripened cotton bolls will be drawn out of the rear compartment through suction means created by the draft of air moving through the duct 37 and be drawn upwardly and rearwardly into the elbow 41 to be caught in the blast of air moving through the juncture 45. At this point, the ripened cotton bolls will be moved not through suction, but through a direct air blast from the duct 37. It should be noted that at no time does the ripened cotton bolls come into contact with any portion of the blower 35 and do in fact move on a movement of air throughout their travel from the harvester to the basket 15.

While only one form of the invention has been shown, it should be recognized that other forms and variations will occur to those skilled in the art. Therefore, while the preferred form was shown for the purpose of concisely and completely illlustrating the principles of the invention, it should be understood that there is no intention to limit or narrow the invention beyond the broad concepts set forth in the appended claims.

What is claimed is:

1. A cotton conveying system for moving cotton to a material container from a cotton harvester in which harvested cotton is discharged laterally outwardly through an upright side opening of a harvester housing comprising: an outboard casing with front and rear compartments separated by an upright panel spaced from the floor of the casing to define a passage between the compartments, and one of the compartments being inwardly opening to receive the harvested cotton bolls through the upright side opening and the other compartment having an upwardly opening outlet means, a blower on the harvester, conduit means in a by-passing relation to the blower having an inlet end in communication with the outlet and a discharge end in communication with the material container, and a blower outlet juncture connected to and in communication with the conduit means above the casing and between the inlet end and discharge end and for directing air toward the discharge end.

2. A cotton conveying system for moving cotton to a material container from a cotton harvester in which harvested cotton is discharged laterally outwardly through an upright side opening of a harvester housing comprising: a casing with adjoining compartments separated by an upright panel spaced from the floor of the casing to define a passage between the compartments, and one of the compartments being inwardly opening to receive harvested cotton bolls through the upright side opening and the other compartment having an upwardly opening outlet means, a blower on the harvester, conduit means in a by-passing relation to the blower having an inlet end in communication with the outlet and a discharge end in communication with the material container, and a blower outlet juncture connected to and in communication with the conduit means between the inlet end and discharge end and directing air toward the discharge end.

3. The structure as set forth in claim 2 in which the harvester includes a main frame and the blower is supported on the main frame in a remote position from the conduit, and the discharge is a blower discharge duct extending between the blower and conduit and connected to the latter between the ends thereof.

References Cited

UNITED STATES PATENTS

| | | | |
|---|---|---|---|
| 1,885,437 | 11/1932 | Harazin | 302—21 |
| 2,741,888 | 4/1956 | Hamel et al. | 56—30 |
| 2,912,285 | 11/1959 | Hubbard | 56—30 |
| 3,088,262 | 5/1963 | Graham | 56—41 |

ANDRES H. NIELSEN, *Primary Examiner.*